US010266264B2

(12) United States Patent
Luo et al.

(10) Patent No.: US 10,266,264 B2
(45) Date of Patent: Apr. 23, 2019

(54) UNMANNED AERIAL VEHICLE

(71) Applicant: AUTEL ROBOTICS CO., LTD., Shenzhen, Guangdong (CN)

(72) Inventors: Dongdong Luo, Guangdong (CN); Feng Ni, Guangdong (CN); Hang Lv, Guangdong (CN); Wenbing Su, Guangdong (CN)

(73) Assignee: AUTEL ROBOTICS CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 16/003,589

(22) Filed: Jun. 8, 2018

(65) Prior Publication Data

US 2018/0290749 A1 Oct. 11, 2018

Related U.S. Application Data

(63) Continuation-in-part of application No. PCT/CN2017/113768, filed on Nov. 30, 2017.

(30) Foreign Application Priority Data

Dec. 5, 2016 (CN) ...................... 2016 2 1321920 U

(51) Int. Cl.
*B64C 39/02* (2006.01)
*B60L 11/18* (2006.01)
*B64D 27/24* (2006.01)
*B60L 58/12* (2019.01)
*B60L 50/60* (2019.01)

(52) U.S. Cl.
CPC ........ *B64C 39/024* (2013.01); *B60L 11/1861* (2013.01); *B60L 11/1877* (2013.01);
(Continued)

(58) Field of Classification Search
CPC ......... B64C 2201/042; B64C 2201/141; B60L 11/1853; B60L 2200/10
See application file for complete search history.

(56) References Cited

U.S. PATENT DOCUMENTS 5,297,759 A 3/1994 Tilbor et al.
2014/0061376 A1* 3/2014 Fisher ...................... B60K 1/00
244/62

(Continued)

FOREIGN PATENT DOCUMENTS

CN 102185346 A 9/2011
CN 102602540 A 7/2012
(Continued)

OTHER PUBLICATIONS

International Search Report dated Feb. 28, 2018; PCTCN2017/113768 *English Translation is Not Available From WIPO at This Time*.

(Continued)

*Primary Examiner* — Nicholas McFall
(74) *Attorney, Agent, or Firm* — Ladas & Parry LLP; Loren K. Thompson

(57) ABSTRACT

The present invention discloses an unmanned aerial vehicle, including: a fuselage; a battery accommodation cavity, disposed on the fuselage; a battery pack, including at least two battery blocks and mounted inside the battery accommodation cavity; a battery circuit board, electrically connected to the battery blocks in the battery pack; and a functional module, electrically connected to the battery circuit board, the battery blocks in the battery pack supplying power to the functional module via the battery circuit board at the same time. By using the solution of the present invention, endurance of the unmanned aerial vehicle is increased.

18 Claims, 6 Drawing Sheets

(52) U.S. Cl.
CPC .............. *B60L 50/66* (2019.02); *B60L 58/12* (2019.02); *B64D 27/24* (2013.01); *B64C 2201/024* (2013.01); *B64C 2201/042* (2013.01); *B64C 2201/141* (2013.01); *Y02T 10/7005* (2013.01); *Y02T 50/62* (2013.01)

(56) References Cited

U.S. PATENT DOCUMENTS

2015/0158392 A1* 6/2015 Zhao .................. B60L 11/1861 320/109
2018/0244377 A1* 8/2018 Chan ..................... B64C 27/605

FOREIGN PATENT DOCUMENTS

| CN | 202905889 U | 4/2013 |
|---|---|---|
| CN | 203690968 U | 7/2014 |
| CN | 204297103 U | 4/2015 |
| CN | 204297103 U | 4/2015 |
| CN | 104743121 A | 7/2015 |
| CN | 204680701 U | 9/2015 |
| CN | 105098898 A | 11/2015 |
| CN | 105292457 A | 2/2016 |
| CN | 205131646 U | 4/2016 |
| CN | 205150264 U | 4/2016 |
| CN | 105548904 A | 5/2016 |
| CN | 205203399 U | 5/2016 |
| CN | 205248837 U | 5/2016 |
| CN | 206218239 U | 6/2017 |
| JP | 2015-137092 A | 7/2015 |

OTHER PUBLICATIONS

Extended European Search Report dated Nov. 6, 2018; Appln. No. 17872893.7.

* cited by examiner

UNMANNED AERIAL VEHICLE

CROSS REFERENCE

The present application is a continuation in part of International Application No. PCT/CN 2017/113768, filed on Nov. 30, 2017, which claims priority to Chinese Patent Application No. 201621321920.4, entitled "UNMANNED AERIAL VEHICLE" filed with the Chinese Patent Office on Dec. 5, 2016, both of which are incorporated herein by reference in their entirety.

TECHNICAL FIELD

The present invention relates to the field of drone technologies, and in particular, to an unmanned aerial vehicle.

RELATED ART

An unmanned aerial vehicle is an unmanned aircraft managed by using radio remote control equipment and a self-contained program control device. Unmanned aerial vehicles are applied in the military field in the early stage, and are gradually applied in the consumer field with the development of science. Currently, unmanned aerial vehicles are widely applied in a variety of fields such as street view photographing, movie and television play shooting, environmental monitoring, geological survey, map drawing, and monitoring in terms of agriculture, forestry, and husbandry.

Unmanned aerial vehicles are classified into an unmanned fixed-wing aircraft, an unmanned multi-rotor aerial vehicle, and the like. A normal unmanned aerial vehicle is powered by a battery. For example, a currently popular four-rotor unmanned aerial vehicle is powered by a single battery. However, energy density of a single battery cannot be further improved due to a limitation of a current battery technology of the unmanned aerial vehicle. In addition, energy of a single battery needs to be less than 100 Wh according to the international convention. Consequently, an electric quantity provided by a single battery is very limited, leading to very short endurance of the unmanned aerial vehicle.

SUMMARY

To resolve a technical problem in the prior art that endurance of an unmanned aerial vehicle is short due to a small power supply volume, the present invention provides an unmanned aerial vehicle.

The unmanned aerial vehicle provided in the present invention includes:

a fuselage;

a battery accommodation cavity, disposed on the fuselage;

a battery pack, including at least two battery blocks and mounted inside the battery accommodation cavity;

a battery circuit board, electrically connected to the battery blocks in the battery pack; and a functional module, electrically connected to the battery circuit board, the battery blocks in the battery pack supplying power to the functional module via the battery circuit board at the same time.

In some embodiments, the battery accommodation cavity is disposed at at least one of the following locations on the fuselage: an inner portion, a side portion, a bottom portion or a top portion.

In some embodiments, each battery block includes a battery housing, a battery disposed inside the battery housing, an adapter board and a protection board;

the adapter board is electrically connected to the battery and is configured to monitor a performance status of the battery and feed back a monitoring result to a flight control hoard in the functional module; and the protection board is disposed on an outer side of the battery and is configured to protect the battery.

In some embodiments, the adapter boards of the battery blocks in the battery pack are sequentially connected to form a series structure and an adapter board of one battery block in the battery pack is electrically connected to the battery circuit board.

In some embodiments, the adapter boards of the battery blocks in the battery pack are respectively connected to the battery circuit board and the battery blocks in the battery pack form a parallel structure via the battery circuit board.

In some embodiments, the battery circuit board includes at least two inner power supply loops and the two inner power supply loops are configured to allocate a total voltage on the battery circuit board; and the functional module includes at least two electronic boards and each of the at least two inner power supply loops is electrically connected to at least one electronic board.

In some embodiments, the at least two battery blocks are evenly distributed around the center of the fuselage.

In some embodiments, the fuselage includes a fuselage body and multiple arms spaced on an outer periphery of the fuselage body, the battery accommodation cavity is disposed inside the fuselage body, each opening of the battery accommodation cavity is located between two neighboring arms and at least one battery block is mounted at each opening of the battery accommodation cavity.

In some embodiments, the battery accommodation cavity runs through the fuselage body on a plane of the fuselage body in a first direction and/or a second direction, the first direction being perpendicular to the second direction.

In some embodiments, the battery accommodation cavity includes two openings and the battery pack includes two battery blocks, the two battery blocks being oppositely disposed inside the battery accommodation cavity respectively via the two openings.

In some embodiments, the battery accommodation cavity includes four openings and the battery pack includes four battery blocks, the four battery blocks being disposed inside the battery accommodation cavity respectively via the four openings and two battery blocks in a same direction being disposed oppositely.

In some embodiments, the battery circuit board is a printed circuit board assembly (PCBA).

The technical solution provided in the embodiments of the present invention can include the following beneficial effects:

In the present invention, the battery pack including at least two battery blocks is disposed inside the battery accommodation cavity, the battery blocks in the battery pack being electrically connected to the battery circuit board, and the battery blocks in the battery pack supplying power to the functional module via the battery circuit board at the same time. Compared with the prior art in which a single battery is used to supply power, in the present invention, a battery capacity of an unmanned aerial vehicle is increased, and endurance of the unmanned aerial vehicle is lengthened.

It should be understood that the foregoing general description and the following detailed description are merely exemplary, and cannot limit the present invention.

BRIEF DESCRIPTION OF THE DRAWINGS

The accompanying drawings herein are included in this specification, form a part of this specification, show embodiments conforming to the present invention, and are used, together with this specification, to explain the principle of the present invention.

LIST OF REFERENCE NUMERALS

Figure 1:
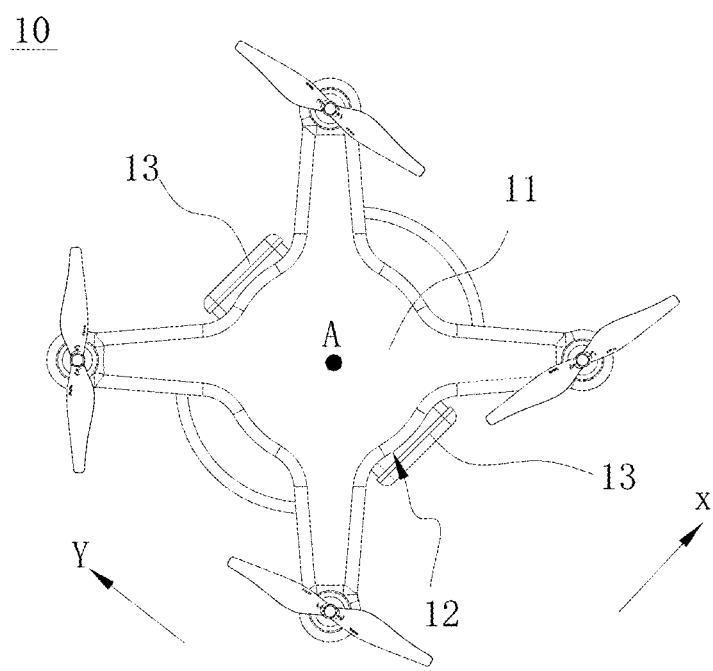
FIG. 1 is a schematic view of an external structure of an unmanned aerial vehicle according to an embodiment of the present invention.

10. Unmanned aerial vehicle; 11. Fuselage; 12. Battery accommodation cavity; 13. Battery block; 14. Battery circuit board; 15. Functional module; 111. Fuselage body; 112. Arm; 113. Propeller; 114. Power motor; 115. Landing gear; 131. Battery housing; 132. Battery; 133. Adapter board; 134. Protection board; 151. Flight control board; 152. Functional electronic board; 1521. Electronic speed control board; 1522. Steering driving board; and 1523. Radar electronic board.

DETAILED DESCRIPTION

The following clearly and describes the technical solutions of the present invention with reference to the accompanying drawings. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

In the description of the present invention, it should be noted that directions or location relationships indicated by terms "center", "upper", "lower", "left", "right", "vertical", "horizontal", "inner", "outer", and the like are directions or location relationships shown based on the accompanying drawings, are merely used to facilitate description of the present invention and simplified descriptions, but are not used to indicate or imply that a device or an element must have a particular direction or must be constructed and operated in a particular direction, and therefore, cannot be understood as a limitation to the present invention. In addition, terms "first", "second", and the like are merely used for description, but cannot be understood as indication or implication of relative importance.

In the description of the present invention, it should be noted that unless otherwise specified and limited, terms "mounting", "communicating", and "connecting" should be understood in a generalized way, for example, may be fixed connection, detachable connection, or integral connection; may be mechanical connection, or electrical connection; may be direct connection, indirect connection using an intermediate medium, or internal communication between two elements. A person of ordinary skill in the art may understand specific meanings of the terms in the present invention according to specific situations.

In the embodiments of the present invention, a term "A and/or B" includes one of the following three cases: A; B; A and B.

In addition, the following described technical features in different implementations of the present invention may be combined provided that no conflict exists between the technical features.

An unmanned aerial vehicle provided in the present invention may be applied to multiple types of aerial vehicles, for example, a fixed-wing unmanned aerial vehicle, or a multi-rotor unmanned aerial vehicle. In the present invention, the solution of the present invention is described by using a four-rotor unmanned aerial vehicle as an example.

Figure 2:
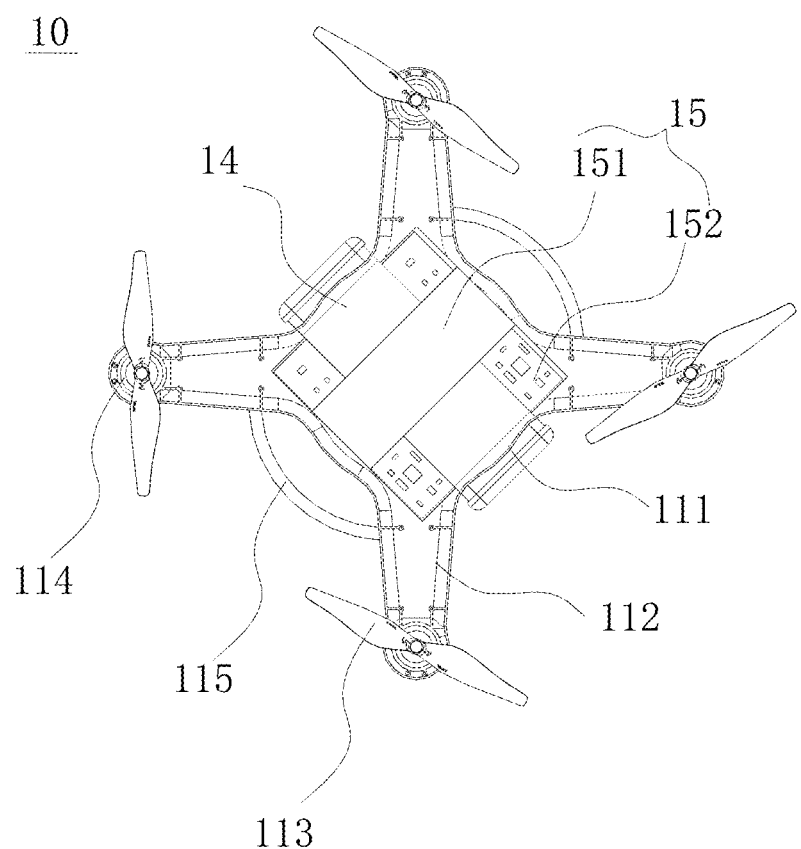
FIG. 2 is a view of an internal structure of the unmanned aerial vehicle shown in FIG. 1.

As shown in FIG. 1 and FIG. 2, FIG. 1 is a schematic view of an external structure of an unmanned aerial vehicle 10 according to an embodiment of the present invention and FIG. 2 is a view of an internal structure of the unmanned aerial vehicle 10 shown in FIG. 1. The unmanned aerial vehicle 10 includes a fuselage 11, a battery accommodation cavity 12 disposed on the fuselage 11, a battery pack mounted inside the battery accommodation cavity 12, a battery circuit board 14 electrically connected to battery blocks in the battery pack, and a functional module 15 disposed inside the fuselage 11. In this embodiment, the battery accommodation cavity 12 is disposed inside the fuselage 11. In another embodiment, the battery accommodation cavity 12 may alternatively be disposed at another location on the fuselage 11, for example, disposed on a side portion, a bottom portion or a top portion of the fuselage 11. The functional module 15 is electrically connected to the battery circuit board 14, and the battery pack includes at least two battery blocks 13, for example, two battery blocks, three battery blocks or four battery blocks. The battery circuit board 14 may be directly electrically connected to the one or more battery blocks 13 in the battery pack. The battery blocks 13 in the battery pack supply power to the functional module 15 via the battery circuit board 14 at the same time.

The fuselage 11 includes a fuselage body 111, multiple arms 112, multiple propellers 113, multiple power motors 114 and landing gears 115. The multiple arms 112 extend outwards from the fuselage body 111 and are evenly distributed on an outer periphery of the fuselage body 111. One power motor 114 is disposed on a tail end of each arm 112. The power motor 114 is connected to the propeller 113. The propellers 113 are driven by the power motors 114 to rotate at a high speed. Rotation interacts with the air to generate lifting force, so as to drive the unmanned aerial vehicle 10 to rise. The landing gears 115 are configured to support weight of the unmanned aerial vehicle 10 when the unmanned aerial vehicle 10 parks on the ground or when the unmanned aerial vehicle 10 takes off or lands.

The battery accommodation cavity 12 is disposed inside the fuselage body 111, an opening of the battery accommodation cavity 12 is located between two neighboring arms 112 and at least one battery block 13 is mounted at each opening of the battery accommodation cavity 12. The battery accommodation cavity 12 may run through the fuselage body 111 on a plane of the fuselage body 111 in a first direction and/or a second direction. In other words, the battery accommodation cavity 12 may run through the fuselage body 111 on the plane of the fuselage body 111 in the first direction; or the battery accommodation cavity 12 may run through the fuselage body 111 on the plane of the fuselage body 111 in the second direction; or the battery accommodation cavity 12 may run through the fuselage body 111 on the plane of the fuselage body 111 in the first direction and the second direction. The first direction may be perpendicular to the second direction. It should be noted that the battery accommodation cavity 12 may not run through the fuselage body. That is, the battery accommodation cavity 12 may be a blind hole.

In an embodiment, the battery accommodation cavity 12 extends in the first direction (the Y-axis direction shown in FIG. 1) and runs through the fuselage body 111 on the plane of the fuselage body 111 in the first direction. The battery accommodation cavity 12 includes two openings. Two battery blocks 13 are inserted into the battery accommodation cavity 12 respectively via the two openings and are mounted inside the battery accommodation cavity 12. To ensure equilibrium and stability of the unmanned aerial vehicle, the two battery blocks 13 are oppositely disposed inside the battery accommodation cavity 12, in other words, are located on a same plane and are symmetrically arranged in a line around the center of the fuselage. It may be understood that multiple battery blocks may be disposed at each opening of the battery accommodation cavity 12. For example, two battery blocks are disposed at one opening. The battery accommodation cavity 12 extends in the first direction in FIG. 1. However, this is not limited thereto.

In an embodiment, the battery accommodation cavity 12 may extend in the second direction (the X-axis direction shown in FIG. 1) and run through the fuselage body 111 on the plane of the fuselage body 111 in the second direction. The first direction and the second direction are perpendicular to each other and are located on a same plane.

In another embodiment, the battery accommodation cavity 12 may alternatively extend in the first direction and the second direction in a cross manner, and run through the fuselage body 111 on the plane of the fuselage 111 in the first direction and the second direction. The battery accommodation cavity 12 is of a cross shape, and one opening is formed on each end portion of the cross. There are four openings in total, and each opening is located between two neighboring arms 112. One battery block 13 may be mounted at each opening. The battery accommodation cavity 12 can accommodate four battery blocks 13. In other words, two battery blocks 13 are placed in the second direction, two battery blocks 13 are placed in the first direction, the four battery blocks 13 do not overlap and are arranged on a same horizontal plane and two battery blocks in a same direction (in the second direction or the first direction) are disposed oppositely.

To ensure equilibrium of the unmanned aerial vehicle, the openings used for mounting the battery blocks 13 in the battery accommodation cavity 12 are evenly distributed around the center (as shown in FIG. 1, point A is the center of the fuselage) of the fuselage 11. In other words, the at least two battery blocks 13 mounted inside the battery accommodation cavity 12 are evenly distributed around the center of the fuselage 11. As shown in FIG. 1, two battery blocks 13 are evenly distributed at two sides of point A.

An extension direction or a shape of the battery accommodation cavity 12 is not limited to the case listed above, and may vary with a type of the unmanned aerial vehicle (for example, a four-rotor unmanned aerial vehicle, or a six-rotor unmanned aerial vehicle) and a shape or a volume of the fuselage 11. In addition, the number of the battery blocks 13 may also vary with the battery accommodation cavity 12, and at least two battery blocks 13 are placed inside the battery accommodation cavity 12.

Figure 3:
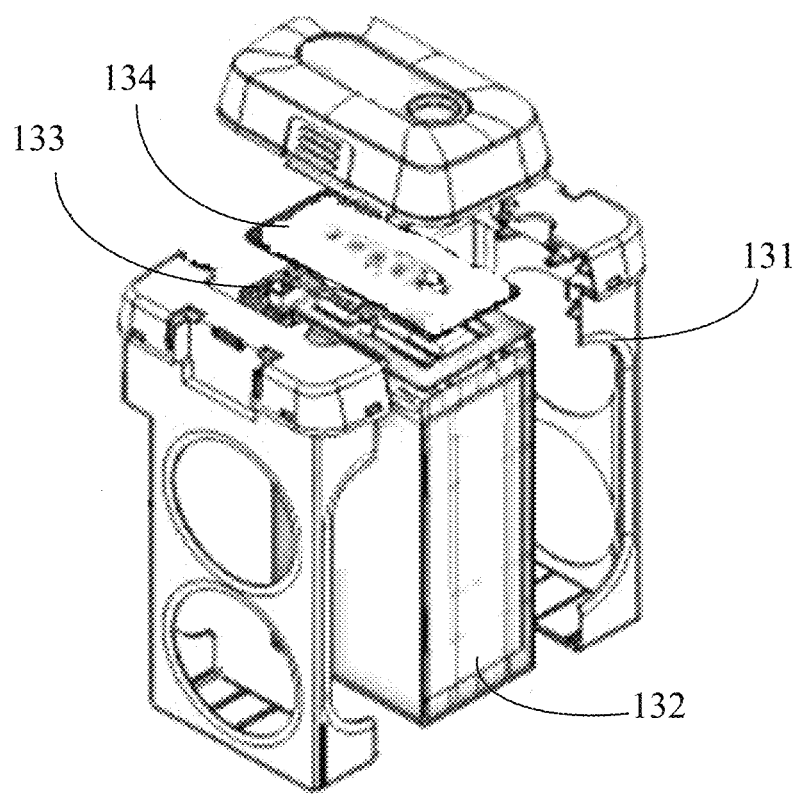
FIG. 3 is a schematic structural view of a battery block of the unmanned aerial vehicle shown in FIG. 1.

As shown in FIG. 3, FIG. 3 is a schematic structural view of the battery block 13. The battery block 13 includes a battery housing 131, a battery 132 disposed inside the battery housing 131, an adapter board 133 and a protection board 134. The adapter board 133 (also referred to as a battery management module) is electrically connected to the battery 132 and is configured to monitor a performance status of the battery 132, for example, a temperature and a capacity of the battery, and feed back a monitoring result to a flight control board in the functional module 15. The protection board 134 is disposed on an outer side of the battery 132 and may cover the entire battery 132. The protection board 134 may be a metal board, for example, an aluminum board, and is configured to protect the battery 132 when the battery falls, to prevent the battery 132 from being broken or deformed.

The battery circuit board 14 may be tightly mounted on an outer surface of a battery housing 131 of one battery block 13 or may be disposed on a base board of the fuselage 11. The battery circuit board 14 is electrically connected to the functional module 15 and the battery blocks 13 in the battery pack supply power to the functional module 15 via the battery circuit board 14 at the same time. The battery circuit board 14 is capable of controlling the battery blocks 13 to supply power to the functional module 15 at the same time. Specifically, the battery circuit board 14 may have a control circuit and the control circuit is capable of controlling electronic switches electrically connected with the at least two battery blocks 13 to be switched on at the same time, so as to control the at least two battery blocks 13 to power the functional module 15 at the same time. The electronic switches are used for controlling the on/off status of the at least two battery blocks 13. In other possible embodiments, the battery circuit board 14 may further have a function of balancing voltages. That is, when voltages of the at least two battery blocks are not equal during discharging at the same time, the battery circuit board 14 may turn off those battery blocks having lower voltages to let those battery blocks having higher voltages to discharge first and switch on the battery blocks having lower voltages as soon as the voltages of the battery blocks having higher voltages are equal to that of the battery blocks having lower voltages to avoid an airplane crash caused by unequal voltages during discharging.

At least one battery block 13 in the battery pack is electrically connected to the battery circuit board 14. For example, when the battery blocks 13 in the battery pack form a series structure, only one battery block 13 in the battery pack is electrically connected to the battery circuit board 14. When the battery blocks 13 in the battery pack form a parallel structure, each battery block 13 in the battery pack is electrically connected to the battery circuit board 14. An implementation process in which the battery blocks in the battery pack form a series structure or a parallel structure is as follows:

Implementation process in which the battery blocks 13 in the battery pack form a series structure:

The adapter boards 133 of the battery blocks 13 in the battery pack are sequentially connected to form a series structure and the battery pack having the series structure is connected to the battery circuit board 14 via an adapter board 133 of one battery block 13. For example, the battery pack includes two battery blocks: a battery block A and a battery block B. One group of positive and negative power interfaces are disposed on an adapter board of the battery block A, and two groups of positive and negative power interfaces are disposed on an adapter board of the battery block B. The positive power interface of the battery block A is connected to a negative power interface in a first group of positive and negative power interfaces of the battery block B and the negative power interface of the battery block A is connected to a positive power interface in the first group of positive and negative power interfaces of the battery block B, so that a loop is formed between the battery block A and the battery block B. A second group of positive and negative power interfaces of the battery block B are respectively connected to positive and negative interfaces of the battery circuit board 14. In this way, the battery blocks in the battery pack form the series structure, and the battery blocks connected in series are electrically connected to the battery circuit board 14 and supplies power to the functional module 15.

Figure 4:
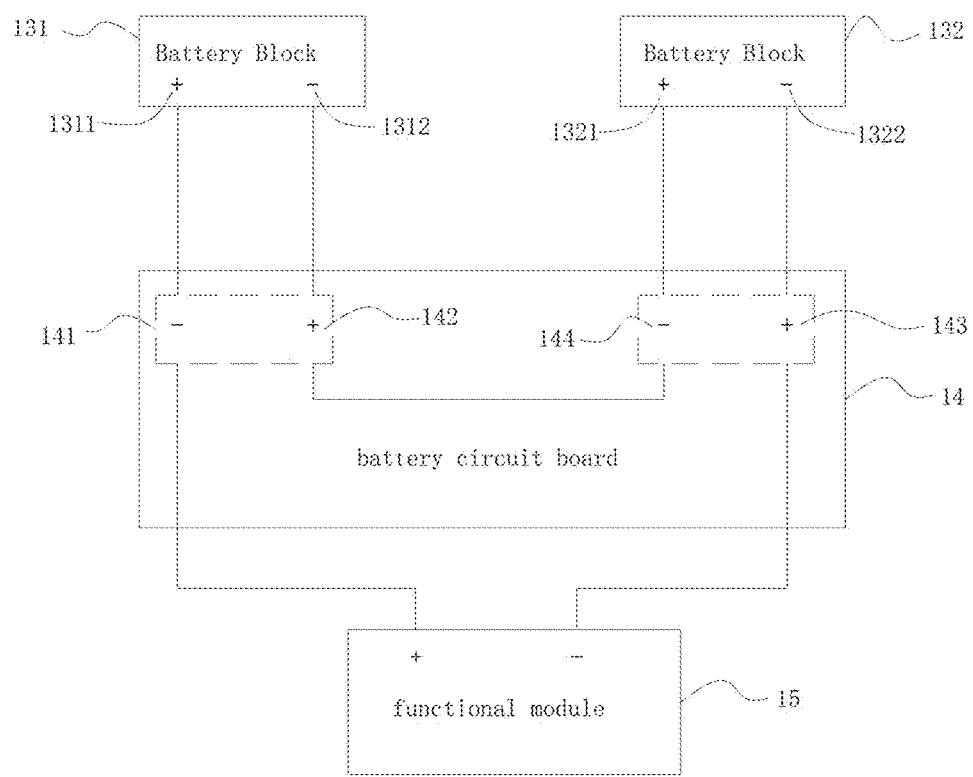
FIG. 4 is a schematic structural view of a series structure formed by the battery blocks.

In another embodiment of the present invention, implementation process in which the battery blocks 13 in the battery pack form a series structure:

Referring to FIG. 4, the battery pack includes two battery blocks: a first battery block 131 and a second battery block 132. The first battery block 131 comprise a first positive power interface 1311 and a first negative power interface 1312, and the second battery block 132 comprises a second positive power interface 1321 and a second negative power interface 1322. The battery circuit board 14 comprises a third positive power interface 142, a third negative power interface 141, a fourth positive power interface 143 and a fourth negative power interface 144.

The first positive power interface 1311 is electrically connected to the third negative power interface 141, and the first negative power interface 1312 is electrically connected to the third positive power interface 142.

The second positive power interface 1321 is electrically connected to the fourth negative power interface 144, and the second negative power interface 1322 is electrically connected to the fourth positive power interface 143.

The third positive power interface 142 is electrically connected to the fourth negative power interface 144.

The third negative power interface 141 is electrically connected to a positive power interface of the functional module 15 and the fourth positive power interface 143 is electrically connected to a negative power interface of the functional module 15.

In addition, performance statuses of the battery blocks 13 in the battery pack may also be fed back to the flight control board by forming a series structure of the adapter boards 133 of the battery blocks 13. Specifically, battery block A is equipped with one data transmission interface, battery block B is equipped with two data transmission interfaces. The data transmission interface on the adapter board of the battery block A is connected to one data transmission interface on the adapter board of the battery block B, and the other data transmission interface on the adapter board of the battery block B is connected to the flight control board. In this way, a performance status of the battery block A is transmitted to the battery block B via the data transmission interface on the adapter board of the battery block A, and the battery block B feeds back the performance status of the battery block A and a performance status of the battery block B to the flight control board via the other data transmission interface on the adapter board of the battery block B. After receiving the performance statuses of the battery blocks, the flight control board may further feed back the performance statuses to a remote control device of the unmanned aerial vehicle, so that a user can learn usage statuses of the batteries in the unmanned aerial vehicle in time.

Implementation process in which the battery blocks 13 in the battery pack form a parallel structure:

The adapter boards 133 of the battery blocks 13 in the battery pack are respectively connected to the battery circuit board 14 and the battery blocks 13 in the battery pack form a parallel structure via an inner circuit of the battery circuit board 14. For example, the battery pack includes two battery blocks: a battery block A and a battery block B. Battery block A and battery block B are both equipped with one group of positive and negative power interfaces. The positive power interface of the battery block A is connected to a positive interface in a first group of positive and negative interfaces of the battery circuit board 14, the negative power interface of the battery block A is connected to a negative interface in the first group of positive and negative interfaces of the battery circuit board 14, the positive power interface of the battery block B is connected to a positive interface in a second group of positive and negative interfaces of the battery circuit board 14, and the negative power interface of the battery block B is connected to a negative interface in the second group of positive and negative interfaces of the battery circuit board 14. The positive interface in the first group of positive and negative interfaces is connected to the positive interface in the second group of positive and negative interfaces via an inner circuit of the battery circuit board 14, and the negative interface in the first group of positive and negative interfaces is connected to the negative interface in the second group of positive and negative interfaces via an inner circuit of the battery circuit board 14. In this way, the battery blocks in the battery pack form the parallel structure. It may be understood that the battery circuit board 14 may be equipped with only one group of positive and negative interfaces. In this case, the positive power interface of the battery block A and the positive power interface of the battery block B both are connected to the positive interface of the battery circuit board 14, and the negative power interface of the battery block A and the negative power interface of the battery block B both are connected to the negative interface of the battery circuit board 14.

Figure 5:
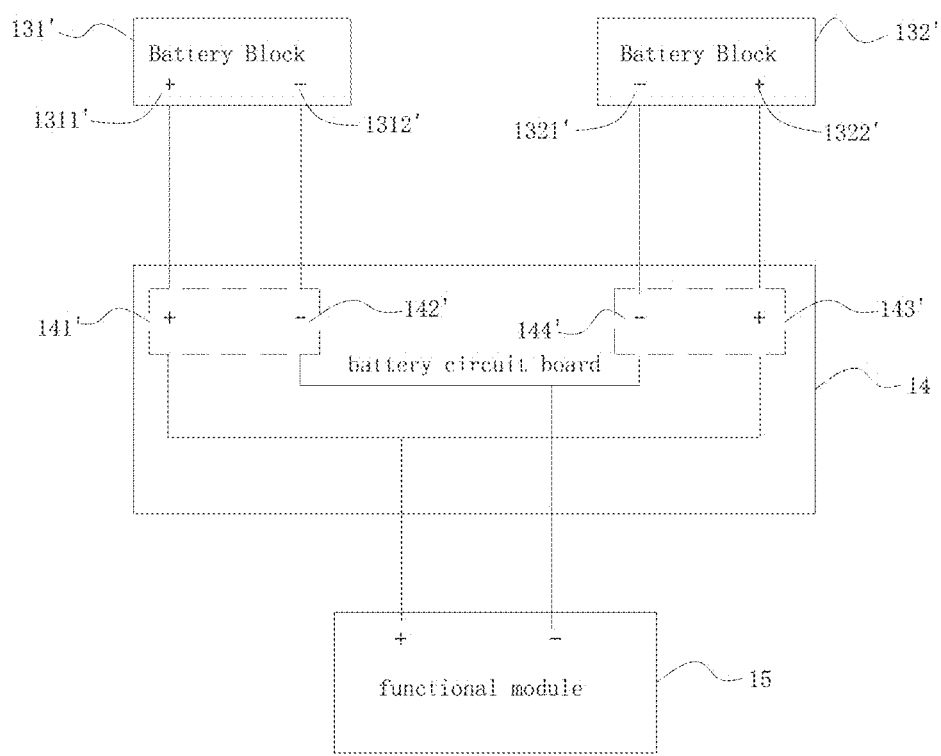
FIG. 5 is a schematic structural view of a parallel structure formed by the battery blocks.

Referring to FIG. 5, the battery pack includes a first battery block 131' and a second battery block 132'. The first battery block 131' comprise a first positive power interface 1311' and a first negative power interface 1312'. The second battery block 132' comprises a second positive power interface 1322' and a second negative power interface 1321'. The battery circuit board 14 comprises a third positive power interface 141', a third negative power interface 142', a fourth positive power interface 143' and a fourth negative power interface 144'.

The first positive power interface 1311' is electrically connected to the third positive power interface 141', and the first negative power interface 1312' is electrically connected to the third negative power interface 142'.

The second positive power interface 1322' is electrically connected to the fourth positive power interface 143', and the second negative power interface 1321' is electrically connected to the fourth negative power interface 144'.

The third positive power interface 141' is electrically connected to the fourth positive power interface 143', and the third negative power interface 142' is electrically connected to the fourth negative power interface 144'.

A positive power interface of the functional module 15 is electrically connected to an inner connection between the third positive power interface 141' and the fourth positive power interface 143'. A negative power interface of the functional module 15 is electrically connected to an inner connection between the third negative power interface 142' and the fourth negative power interface 144'.

In addition, performance statuses of the battery blocks 13 in the battery pack may also be fed back to the flight control board via the respective adapter boards 133 of the battery blocks 13. Specifically, each of the adapter board of the battery block A and the adapter board of the battery block B is equipped with a data transmission interface, and the data transmission interfaces of the battery block A and the battery block B are separately connected to the flight control board. In this way, performance statuses of the battery block A and the battery block B are fed back to the flight control board via the data transmission interfaces of the battery block A and the battery block B.

It may be understood that the battery blocks 13 included in the battery pack may be all connected in series or in parallel and supply power to the functional module 15 via the battery circuit board 14 at the same time. Alternatively, some battery blocks are connected in series first, and then are connected in parallel to the remaining battery blocks, so as to supply power to the functional module 15 via the battery circuit board 14 at the same time. This is not limited in this embodiment.

The functional module 15 includes multiple electronic boards, and the multiple electronic boards may be a flight control board 151 configured to control flight of the unmanned aerial vehicle 10 and functional electronic boards 152. The functional electronic boards 152 are electrically connected to the flight control board 151. The flight control board 151 is disposed above the battery circuit board 14 by using an insulation component, and the functional electronic boards 152 are disposed on side edges of the battery circuit board 14.

The functional electronic boards 152 may include electronic speed control boards 1521, a steering driving board 1522, a radar electronic board 1523, and other electronic boards. No exhaustion is provided herein.

Figure 6:
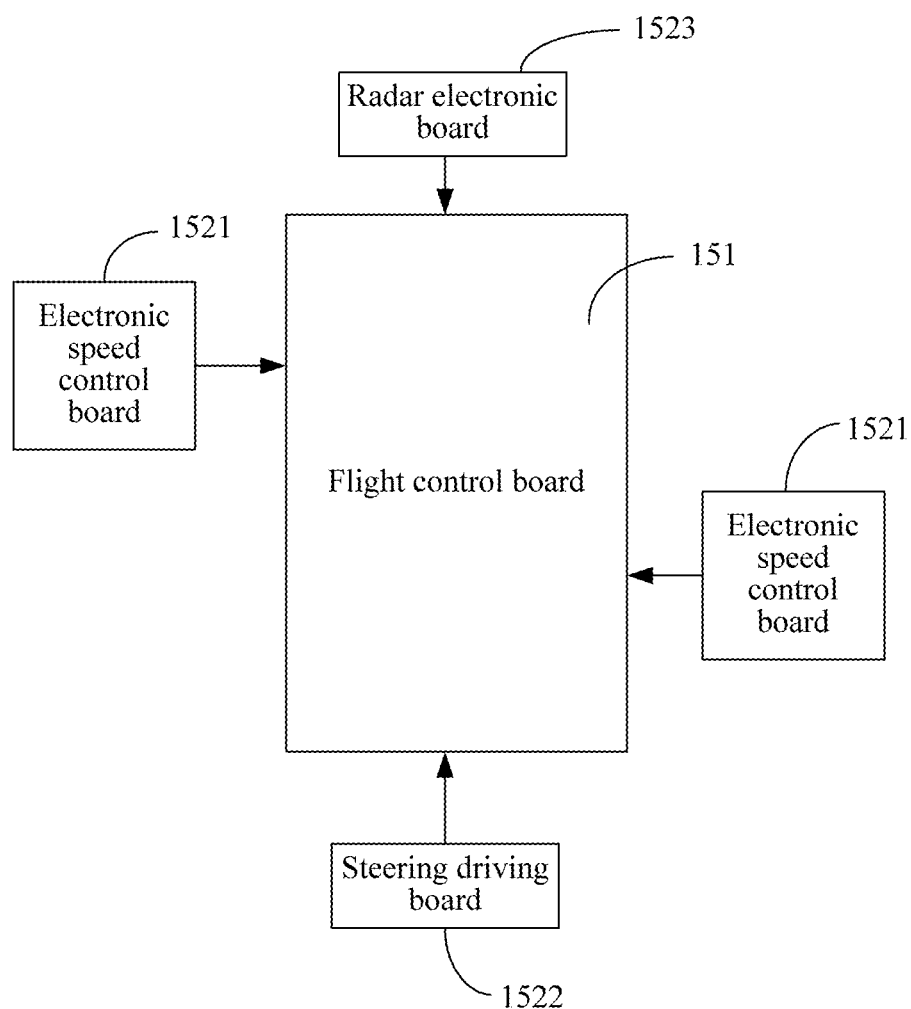
FIG. 6 is a schematic structural view of a functional module of the unmanned aerial vehicle shown in FIG. 1.

As shown in FIG. 6, the electronic speed control boards 1521, the steering driving board 1522, and the radar electronic board 1523 are all electrically connected to the flight control board 151.

The battery circuit board 14 includes one or more than one inner power supply loops, and the battery circuit board 14 supplies power to the functional module 15 via the inner power supply loop. The inner power supply loop may be printed on the battery circuit board 14, and is configured to allocate a total voltage on the battery circuit board 14.

When the battery circuit board 14 includes two or more than two inner power supply loops, the total voltage on the battery circuit board 14 may be equally or unequally allocated by using the inner power supply loops. For example, the battery circuit board 14 includes three inner power supply loops, and the total voltage on the battery circuit board 14 is 10 volts. Then, a voltage provided by a first inner power supply loop is 2.5 volts, a voltage provided by a second inner power supply loop is 3.5 volts, and a voltage provided by a third inner power supply loop is 4 volts. Each power supply loop supplies power to one or more than one corresponding electronic boards according to a supply voltage of the power supply loop. For example, the first inner power supply loop having a low supply voltage supplies power to an electronic board having low power consumption (for example, the radar electronic board 1523), the second inner power supply loop having an intermediate supply voltage supplies power to the flight control board 151, and the third inner power supply loop having a high supply voltage supplies power to an electronic board having high power consumption (for example, the multiple electronic speed control boards 1521). That is, the inner power supply loop 14 is capable of converting the total voltage to a required working voltage. For example, boosting the total voltage or reducing the total voltage. It should be understood that the sum of voltages that being converted by the at least two inner power supply loops 14 are not limit to be equal to the total voltage.

Therefore, by laying two or more inner power supply loops on the battery circuit board 14, power can be supplied to electronic boards having different power consumption for saving electric energy and lengthening endurance further.

Each inner power supply loop on the battery circuit board 14 is electrically connected to at least one electronic board, to supply power to the at least one electronic board. For example, the battery circuit board includes two inner power supply loops, a first inner power supply loop electrically connecting to the flight control board 151, and a second inner power supply loop electrically connecting to the electronic speed control boards 1521, the steering driving board 1522, the radar electronic board 1523 and the like.

In addition, capacities of the multiple battery blocks disposed inside the battery accommodation cavity 12 may be the same or may be different.

The battery circuit board 14 may be a battery PCBA (Printed Circuit Board Assembly).

In the unmanned aerial vehicle in the present invention, when the at least two battery blocks are discharged at the same time, power is supplied to the functional module via the battery circuit board. If a capacity of each battery block is marked as I, a voltage of the battery block is marked as U, discharging utilization of the battery block is marked as η, the number of batteries is marked as n, and total power consumption of the unmanned aerial vehicle is marked as P, the endurance of the aerial vehicle may be represented as $t = n \times U \times I \times \eta / P$, where $n \geq 2$ and $\eta < 1$. As can be learned from the foregoing formula, when a capacity and a voltage of a single battery block are the same, endurance of an unmanned aerial vehicle using two or more battery blocks is far longer than endurance of an unmanned aerial vehicle using a single battery block.

About all, in the present invention, the battery pack is disposed inside the battery accommodation cavity, the battery pack including at least two battery blocks, the battery blocks in the battery pack supplying power to the functional module via the battery circuit board at the same time, and the battery blocks being discharged at the same time, so that a battery capacity of the unmanned aerial vehicle is increased, and endurance of the unmanned aerial vehicle is lengthened.

In addition, in the present invention, the battery circuit board includes at least two inner power supply loops and each inner power supply loop supplies power to one or more corresponding electronic boards, so that the inner power supply loops providing different supply voltages can supply power to the electronic boards having different power consumption. Therefore, power consumption is reduced, and endurance is further lengthened.

Finally, it should be noted that the foregoing embodiments are merely used to describe the technical solutions of the present invention, rather than limiting the present invention. Under the idea of the present invention, the foregoing embodiments or technical features of different embodiments may be combined, steps may be implemented in any sequence, and many other changes in different aspects may be made to the present invention. For brevity, details are not provided. Although the present invention is described in detail with reference to the foregoing embodiments, a person of ordinary skill in the art should understand that modifications may be made to the technical solutions recorded in the foregoing embodiments, or equivalent replacements may be made to some technical features, and the modifications or replacements should not cause the essence of the corresponding technical solutions to depart from the scope of the technical solutions of the embodiments of the present invention.

What is claimed is:

1. An unmanned aerial vehicle, comprising:
   a fuselage having a battery accommodation cavity, wherein the battery accommodation cavity comprises at least two openings;
   a plurality of arms, wherein each arm is coupled to the fuselage, wherein each of the at least two openings is located between two neighboring arms of the plurality of arms;
   a propulsion assembly mounted on the each arm, wherein the propulsion assembly comprises a propeller and a motor, the motor being configured to rotate the propeller in order to generate lift force;
   an electronic board disposed inside the fuselage, wherein the electronic board comprises at least one of a flight control board, an electronic speed control board, a steering driving board and a radar electronic board; and
   at least two battery blocks, wherein each of the at least two battery blocks comprises a battery housing and a battery disposed in the battery housing;
   wherein the each of the at least two battery blocks is inserted into the battery accommodation cavity via one of the at least two openings;
   wherein at least a portion of the each of the at least two battery blocks is visible in a state where the each of the at least two battery blocks is completely installed into the battery accommodation cavity;
   wherein the at least two battery blocks power the electronic board at the same time.

2. The unmanned aerial vehicle according to claim 1, further comprising a battery circuit board electrically connected to the at least two battery blocks, the at least two battery blocks powering the electronic board at the same time via the battery circuit board.

3. The unmanned aerial vehicle according to claim 2, wherein the at least two battery blocks are connected to the battery circuit board respectively to form a parallel structure.

4. The unmanned aerial vehicle according to claim 3, wherein the at least two battery blocks comprises a first battery block and a second battery block.

5. The unmanned aerial vehicle according to claim 4, wherein the first battery block comprises a first positive power interface and a first negative power interface, the second battery block comprising a second positive power interface and a second negative power interface, the battery circuit board comprising a third positive power interface, a third negative power interface, a fourth positive power interface and a fourth negative power interface;
   wherein the first positive power interface is electrically connected to the third positive power interface, the first negative power interface being electrically connected to the third negative power interface;
   wherein the second positive power interface is electrically connected to the fourth positive power interface, the second negative power interface being electrically connected to the fourth negative power interface;
   wherein the third positive power interface is electrically connected to the fourth positive power interface, the third negative power interface being electrically connected to the fourth negative power interface.

6. The unmanned aerial vehicle according to claim 2, wherein the at least two battery blocks are connected to the battery circuit board respectively to form a series structure.

7. The unmanned aerial vehicle according to claim 6, wherein the at least two battery blocks comprise a first battery block and a second battery block.

8. The unmanned aerial vehicle according to claim 7, wherein the first battery block comprises a first positive power interface and a first negative power interface, and the second battery block comprising a second positive power interface and a second negative power interface, the battery circuit board comprising a third positive power interface, a third negative power interface, a fourth positive power interface and a fourth negative power interface;
   wherein the first positive power interface is electrically connected to the third negative power interface, the first negative power interface being electrically connected to the third positive power interface;
   wherein the second positive power interface is electrically connected to the fourth negative power interface, and the second negative power interface being electrically connected to the fourth positive power interface;
   wherein the third positive power interface is electrically connected to the fourth negative power interface.

9. The unmanned aerial vehicle according to claim 2, comprising at least two electronic boards, the battery circuit board comprising at least two inner power supply loops for allocating a total voltage on the battery circuit board to the at least two electronic boards.

10. The unmanned aerial vehicle according to claim 9, wherein each of the at least two inner power supply loops is electrically connected to at least one electronic board.

11. The unmanned aerial vehicle according to claim 1, wherein the at least two battery blocks are connected in series.

12. The unmanned aerial vehicle according to claim 11, wherein the at least two battery blocks comprise a first battery block and a second battery block.

13. The unmanned aerial vehicle according to claim 1, wherein the at least two battery blocks are connected in parallel.

14. The unmanned aerial vehicle according to claim 1, wherein each of the at least two battery blocks further comprises an adapter board electrically connected to the battery;
   wherein the electronic board comprises a flight control board, and the adapter board is configured to monitor a performance status of the battery and feed back a monitoring result to the flight control board.

15. The unmanned aerial vehicle according to claim 14, wherein each of the at least two battery blocks further comprises a protection board configured to prevent the battery from being broken or deformed.

16. The unmanned aerial vehicle according to claim 1, wherein the battery accommodation cavity extends along a first direction and/or a second direction on a plane of the fuselage.

17. The unmanned aerial vehicle according to claim 16, wherein the battery accommodation cavity extends along the first direction and the second direction on the plane of the fuselage, and the first direction are perpendicular to the second direction.

18. The unmanned aerial vehicle according to claim 1, wherein the arms are spaced on an outer periphery of the fuselage.

* * * * *